United States Patent [19]

Tokita

[11] Patent Number: 5,386,499
[45] Date of Patent: Jan. 31, 1995

[54] CONTROLLER AND PROCESS FOR EFFECTING A SHORTER PATH TRAJECTORY IN ROBOT MOVEMENT

[75] Inventor: Takeshi Tokita, Kanagawa, Japan

[73] Assignee: Sony Corporation, Japan

[21] Appl. No.: 47,479

[22] Filed: Apr. 19, 1993

[30] Foreign Application Priority Data

Apr. 27, 1992 [JP] Japan .................. 4-107807

[51] Int. Cl.$^6$ ............................................. G06F 15/46
[52] U.S. Cl. ...................................... 395/85; 395/81; 395/90; 395/88
[58] Field of Search .................. 395/85, 81, 90, 88

[56] References Cited

U.S. PATENT DOCUMENTS

| | | | |
|---|---|---|---|
| 3,629,853 | 12/1971 | Newton | 395/375 |
| 4,562,551 | 12/1985 | Inaba et al. | 395/88 |
| 4,571,694 | 2/1986 | Inaba et al. | 395/88 |
| 4,587,618 | 5/1986 | Oguchi | 395/88 |
| 4,815,007 | 3/1989 | Sakai et al. | 395/88 |
| 4,879,663 | 11/1989 | Fuehrer | 395/85 |
| 4,998,050 | 3/1991 | Nishiyama | 395/83 |
| 5,046,022 | 9/1991 | Conway et al. | 395/85 |
| 5,201,630 | 4/1993 | Ishida et al. | 414/744.5 |

FOREIGN PATENT DOCUMENTS

61-136105 6/1986 Japan .
1108604 4/1989 Japan .

Primary Examiner—Allen R. MacDonald
Assistant Examiner—Richemond Dorvil
Attorney, Agent, or Firm—Ronald P. Kananen

[57] ABSTRACT

A numerical control apparatus for a robot which controls an overlapping operation of the robot executed to minimize the tact time while bypassing an obstacle and which allows an operation program for the robot to be produced easily is provided. The commands of the robot program include an overlapping operation starting point designating instruction which instructs the robot of an overlapping operation which starts from a position of a designated ratio of a preceding single operation, and an overlapping operation ending point designating instruction which instructs the robot of the overlapping operation which ends at a position of a designated ratio of a following single operation. Any overlapping operation of the robot is performed in accordance with either one of the instructions.

13 Claims, 8 Drawing Sheets

CONTROLLER AND PROCESS FOR EFFECTING A SHORTER PATH TRAJECTORY IN ROBOT MOVEMENT

BACKGROUND OF THE INVENTION

1. Field of the Invention

This invention relates to a numerical control apparatus for a robot, and more particularly to a numerical control apparatus for a robot of the type wherein the movement of the robot between two designated points is performed in a series of single operations and wherein one of the single operations is performed before completion of the prior operation to reduce tact time.

2. Description of the Related Art

A robot system, wherein the movement of the robot between two designated points is performed in a series of single operations and wherein one of the single operations is performed before completion of the prior operation to reduce tact time has previously been proposed in the prior art, as disclosed, for example, in Japanese Patent Laid-Open Application No. Showa 61-136105 or Japanese Patent Laid-Open Application No. Heisei 1-108604.

Figure 1:
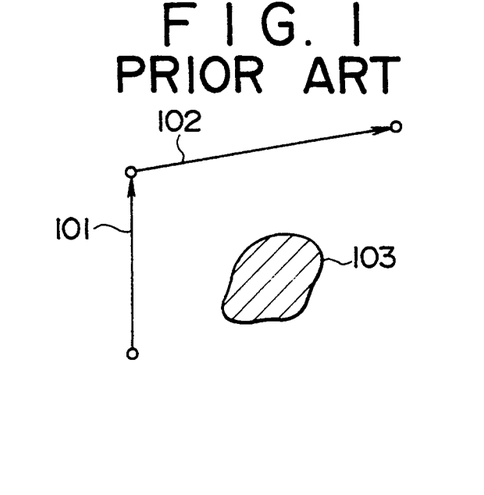
FIG. 1 is a diagrammatic view illustrating an example of successive operations of the prior art.
Figure 2:
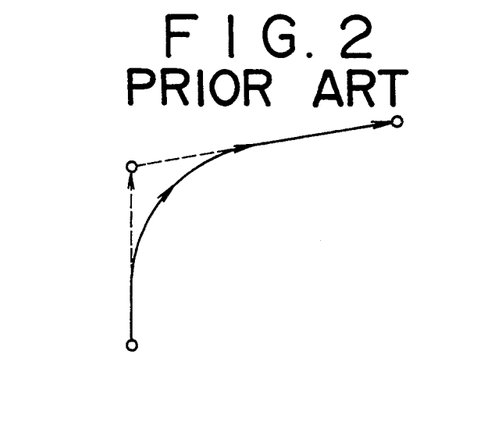
FIG. 2 is a diagrammatic view illustrating an example of an overlapping operation of the prior art.

In the robots of the prior art, as shown in FIG. 1, independent operation trajectories of an operation 1 labelled 101, and another operation 2 labelled 102, which are programmed so as to bypass an obstacle 103, are performed such that the operation 2 is started before completion of the operation 1 so that the operation 1 and the operation 2 may be connected by way of a continuous operation trajectory as shown in FIG. 2 in order to save the deceleration time of the operation 1 and the acceleration time of the operation 2. This will be referred to as performing an overlapping operation, i.e., overlapping operation 1 and operation 2, for purposes of convenience. For convenience of description, the preceding operation is referred to as "operation 1" at 101 while the following operation is referred to as "operation 2" at 102.

Generally, during operation of a robot, the numerical control apparatus for the robot thereof performs the procedures of (1) calculating the trajectory of an operation immediately before the operation is performed; (ii) calculating position information or velocity information for each unit time; (iii) developing the position or velocity information on a RAM; (iv) reading out the position information for each unit time; and (v) delivering position information read out to a servo controller section.

One method of the prior art for controlling the robot operation involves using the point of time at which the operation 2 should be started so as to perform an overlapping operation, that is to overlap performance of operation 2 with operation 1.

Figure 5:
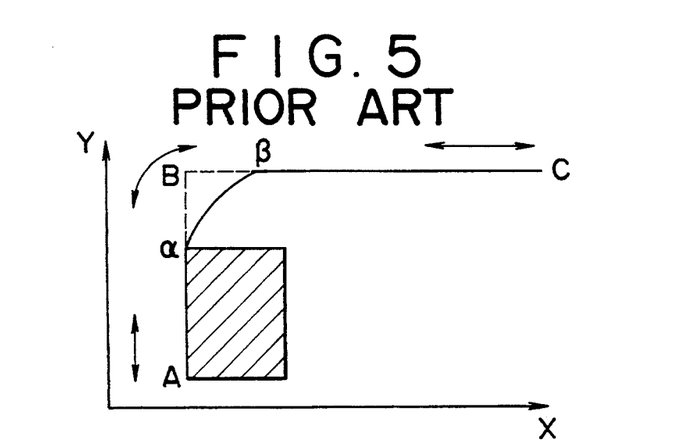
FIG. 5 is a diagrammatic view showing a trajectory of a robot to be programmed by the prior art.
Figure 6:
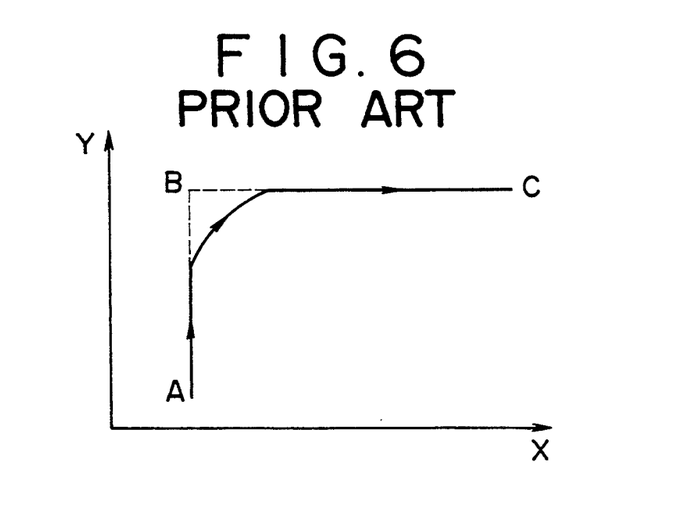
FIG. 6 is a diagrammatic view showing a trajectory of a robot after debugging by the prior art.
Figure 7:
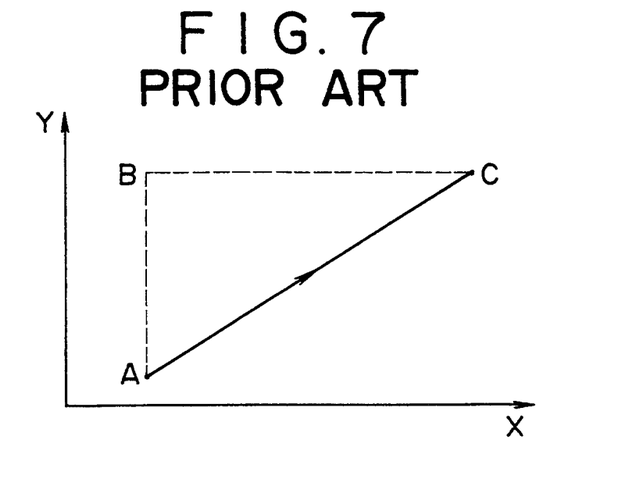
FIG. 7 is a diagrammatic view showing a trajectory of a robot during a main action procedure of the prior art.

This method, however, has certain disadvantages. According to this method, the point of time at which overlapping operation starts to occur can be determined whether or not a particular address of the RAM has been accessed, and the overlapping of the operations is begun when the address has been accessed. Since the starting position at which the overlapping operation occurs is a factor only of time, variation of the operation velocity then also varies the trajectory. Particularly, even though the speed of an operation as shown in FIG. 5 may be lowered upon debugging to bypass an obstacle and take a trajectory as shown in FIG. 6, if the robot later operated at a maximum speed in a main action procedure, then a different and dangerous trajectory such as the one shown in FIG. 7 is traced and the object is not bypassed. Further, this method suffers because the programmer must make complicated calculations to forecast the operation speed of the robot. If the programmer fails to forecast the operation speed or forecasts it incorrectly, then the trajectory cannot be forecast. Thus, programming an operation with a precise trajectory is quite difficult.

Figure 3:
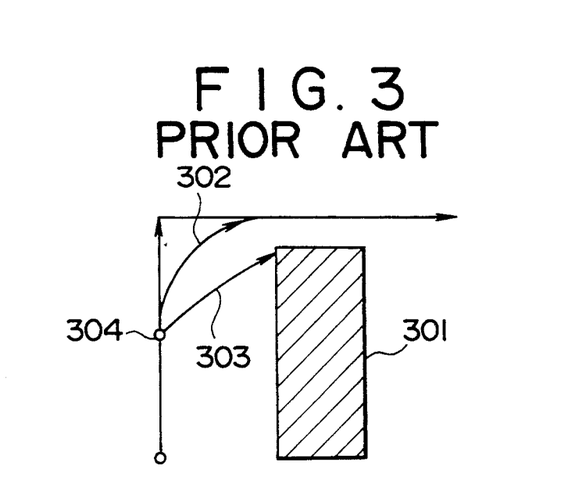
FIG. 3 is a diagrammatic view illustrating a method of the prior art for controlling an overlapping operation.

On the other hand, another method of the prior art involves using the position at which the second operation 2 should be started so as to perform an overlapping operation. In this method, the operation trajectory information developed on the RAM as described above is read out for each unit time and delivered to the servo control section. When it is read out, the value thereof is compared to a predetermined value and the overlapping operation is started when the value read out coincides with the predetermined value. According to this method, when trying to bypass an obstacle such as 301 as shown in FIG. 3, even if a position 304 from which a trajectory shown at 302 starts is precise, if the position at which the overlapping operation is to be completed is not precise, the programmer cannot forecast the trajectory. As a result, the robot may take another trajectory such as the one shown 303 which leads to a collision with the obstacle.

Figure 4:
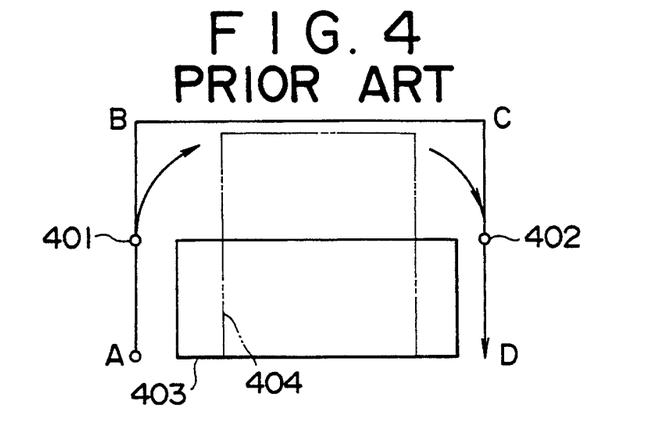
FIG. 4 is a diagrammatic view illustrating another method of the prior art for controlling an overlapping operation.

Further, Japanese Patent Laid-Open Application No. Heisei 1-108604 mentioned above, discloses a method of defining, in advance, an overlapping operation starting point such as 401 and an overlapping operation ending point such as 402, as shown in FIG. 4, for an upwardly moving trajectory and a downwardly moving trajectory, respectively. This method is advantageous when the obstacle has a shape such as that shown by an obstacle 403 in FIG. 4 and the trajectory proximately follows the opposite sides of the obstacle 403. However, when an obstacle has the shape of an obstacle 404 as shown in FIG. 4 and the trajectory proximately follows the upper portion of the obstacle 404, it is difficult to forecast the necessary trajectory. Further, the operation of the robot according to this method includes not only a so-called pick-and-place operation but also a movement bypassing an obstacle as shown in FIG. 4, and this must be taken into consideration.

Thus, it is a problem in the prior art to program a robot operation which accurately avoids obstacles.

SUMMARY OF THE INVENTION

It is an object of the present invention to provide a numerical control apparatus for a robot which assures that the robot will perform the same operation based on the same program irrespective of the speed of operation so that the trajectories of the robot upon debugging and upon main action procedure are not different, thereby minimizing the dangers resulting from the robot tracing a trajectory which cannot be forecast.

In order to attain the object described above, according to an aspect of the present invention, there is provided a numerical control apparatus for a robot, which comprises a robot program storage section for storing therein codes describing a procedure of operations of the robot; a program analysis and execution section for reading out the program from the robot program storage section, analyzing contents of the program and executing the program; a trajectory calculation section for calculating, based on operation aimed position information delivered thereto from the program analysis and execution section, a position to which the robot should be moved for each unit time; a first trajectory calculation value memory for storing a position information string for each unit time obtained from the trajectory calculation section; a second trajectory calculation memory to which contents of the first trajectory calculation value memory are transferred, a first read-out control section for reading out the contents of the first trajectory calculation value memory for each unit time; a second read-out control section for reading out the contents of the second trajectory calculation value memory for each unit time; a time and information management section for providing a read-out starting instruction to the first and second read-out control sections and for providing an instruction to transfer the contents of the first trajectory calculation value memory to the second trajectory calculation value memory, the instruction being provided in accordance with an overlapping operation starting point designating command in the program detected by the program analysis and execution section that instructs an overlapping operation from a position at a designated ratio of a preceding single operation and an overlapping operation ending point designating instruction that instructs another overlapping operation wherein the overlapping movement is ended at a position at a designated ratio of a following single operation; and a vector composition section for composing position information read out from the first and second read-out control sections by vector composition. Where the present numerical control apparatus is employed, either or both an overlapping operation starting point and an overlapping operation ending point of a trajectory of an overlapping operation of the robot, which are difficult to forecast by intuition, are determined precisely thereby improving the degree of freedom in programming and minimizing the problems of the prior art described above.

Since the numerical control apparatus of the present invention assures that the robot will perform the same operation based on the same program regardless of the operation speed, the robot trajectory upon debugging is the same as the robot trajectory in a main action procedure. Accordingly, the possible danger caused by the robot when it traces a trajectory which cannot be forecast can be eliminated.

Further, the present invention allows a programmer to adopt a suitable trajectory upon programming, and since a program for bypassing an obstacle can be written comparatively easily, the present invention also achieves a reduction in the programming time.

Furthermore, since the result of the calculation from the trajectory calculation section need only be written in the first trajectory calculation value memory, the construction of the numerical control apparatus is advantageously simplified.

In addition, with the numerical control apparatus of the present invention, since either of the control methods-the overlapping operation starting point designating instruction and the overlapping operation ending point designating instruction—can be selected upon programming, suitable control designing corresponding to robot operation environment can be begun at the stage of programming.

Meanwhile, the overlapping operation starting and ending point controls can be designated in a mixed condition in the robot program. Accordingly, it is possible to produce a trajectory which readily performs an overlapping operation even for a situation which involves bypassing an obstacle with a complicated profile.

According to another aspect of the present invention, a process of controlling a robot having a robot program storage section for storing codes of a procedure of operations of the robot therein is provided. The process comprises the steps of checking the codes to determine whether or not at least two commands, each representing a single robot operation of movement from a designated point to another designated point, appear successively; selecting, when it is confirmed at the preceding step that at least two commands each representing a single robot operation of movement from a designated point to another designated point appear successively, an operation from among a starting point designating type overlapping operation wherein an overlapping operation is started from a position at a designated ratio of a preceding one of the single operations, an ending point designating type overlapping operation wherein an overlapping operation is ended at a position at a designated ratio of a following one of the single operations, and an independent operation wherein single operation which follows another operation is performed after completion of the preceding single operation; and controlling the robot in accordance with the selection.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

The present invention will be described in the following order: (1) Representation on a Robot Program; (2) Construction of a Numerical Control Apparatus of an Embodiment of the Present Invention; and (3) Processing Procedure of the Numerical Control Apparatus. The Processing Procedure of the Numerical Control Apparatus will further be described in the following order: (3-1) Operation Involving No Overlapping operation; (3-2) Processing Procedure of Overlapping operation Starting Point Control; and (3-3) Processing Procedure of Overlapping operation Ending Point Control.

1. Representation on a Robot Program

When the present invention is put into practice, any of a high level language and a low level language may be adopted as a robot program language. This description, however, will proceed using a high level language for simplification of description. A program List 1 is provided as follows:

| List 1 | | |
|---|---|---|
| move | P0 | - L1 |
| chuck 1 | on | - L2 |
| move | HFOS(50),p1,NFOS(30),p2,p3 | - L3 |
| chuck 1 | off | - L4 |
| chuck 2 | on | - L5 |
| move | NFOS(30),p4,HFOS(80),p5,p6 | - L6 |
| chuck | off | - L7 |

Figure 10:
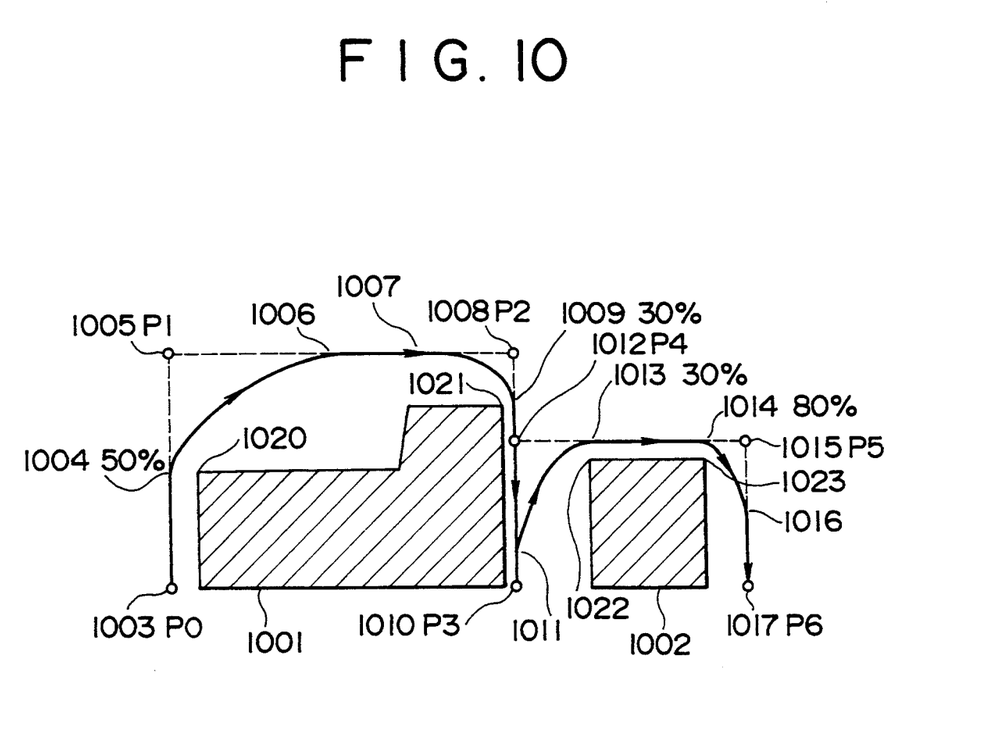
FIG. 10 is a diagrammatic view of the operations of a program List 1 of the present invention.

The above List 1 represents a program for a robot when the robot is to perform the operation of moving a workpiece from the operation starting point P0 shown at 1003 in FIG. 10 and particularly describes the operation procedure of:

(1) bypassing an obstacle 1001;
(2) moving the workpiece to an intermediate workpiece assembling position P3 shown at 1010 between the obstacle 1001 and another obstacle 1002 and assembling the same;
(3) bypassing the obstacle 1002; and
(4) moving the assembly to a final position P6 shown at 1017.

In this case, the trajectory of the robot passes along the proximity of the opposite sides of the obstacle 1001 and along the proximity of an upper portion of the obstacle 1002.

The operation of each of these steps and the operation of each of the statements of List 1 will be described more fully below.

The statements at L3 and L6 of the List 1 above represent the procedure of selecting an overlapping operation starting point control and overlapping operation ending point control, respectively.

The statement L1 represents the step of moving an operating end of the robot, not shown, to the starting position P0, shown at 1003, of a series of operations according to the present program.

The statement L2 represents the step of grasping a workpiece by means of a chuck 1 provided at the operating end of the robot. This procedure prepares the robot for transporting the workpiece at the position P0.

Figure 8:
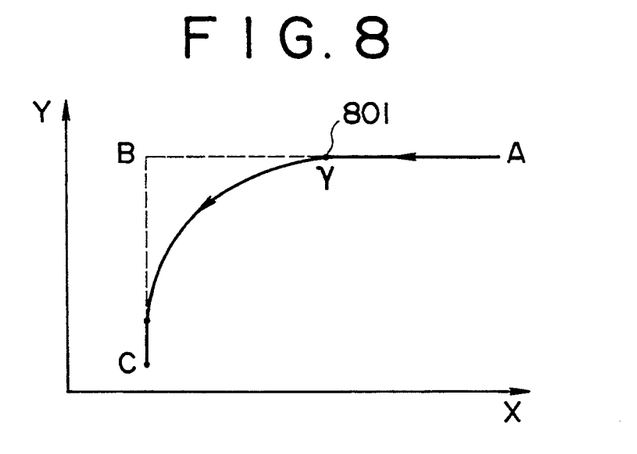
FIG. 8 is a diagrammatic view illustrating control of an overlapping operation starting point according to the present invention.

The statement L3 represents the procedure for transporting the workpiece to the intermediate assembling position P3 at 1010 bypassing the obstacle 1001. In this statement, HFOS(n) represents overlapping an operation for movement of the robot to an aimed position written subsequently to the same with another operation for movement of the robot to another position by an overlapping operation starting point control and beginning the overlapping operation at a position which occurs at n % of the way through the course of the movement to the aimed position. Such an overlapping operation starting point control according to the present invention is shown in FIG. 8 where the overlap starting point is shown at 801.

Figure 9:
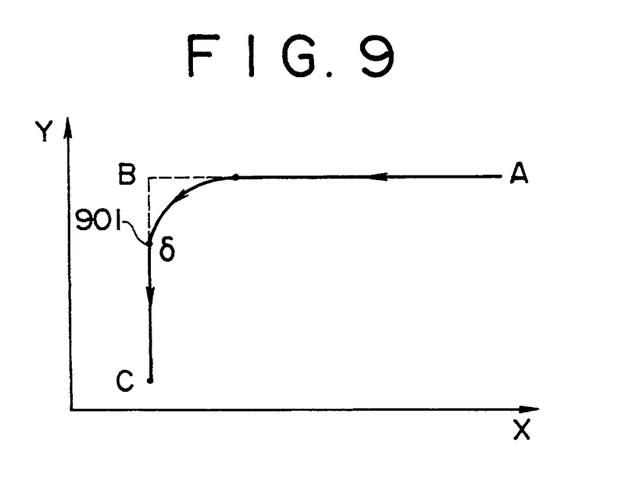
FIG. 9 is a diagrammatic view illustrating control of an overlapping operation ending point according to the present invention.

Meanwhile, NFOS(n) represents overlapping an operation of movement of the robot to an aimed position written subsequently to the same with another operation of movement of the robot to a next aimed position written subsequently to the above first-mentioned aimed position by an overlapping operation ending point control and beginning the overlapping operation at such a position in the course of the movement to the first-mentioned aimed position that will allow the overlapping operation to be completed at a position which occurs at n % of the way through the course of movement to the next aimed position. Such an overlapping operation ending point control according to the present invention is shown in FIG. 9 where the overlap ending point is shown at 901.

Specifically, by the example HFOS(50) used in statement L3, an operation for movement of the robot to the position P1 at 1005 is overlapped with an operation for movement of the robot to the position P2 at 1008. The overlapping operation continues beginning at a position 1004 which occurs 50% of the way through the course of movement to the position P1 1005 to an intermediate point shown at 1006 at which point the overlapping operation is completed. Further, by the example NFOS(30) used in statement L3, the operation for movement of the robot to the position P2 at 1008 is overlapped with an operation for movement of the robot to the position P3 at 1010 beginning at a suitable intermediate point shown at 1007 in the course of movement to the position P2 at 1008. The overlapping operation is ended at a position shown at 1009 which occurs at 30% of the way through the course of movement from the position P2 at 1008 to the position P3 at 1010.

Consequently, it can be recognized that the overlapping operation starting point 1004 and the overlapping operation ending point 1009 can be designated explicitly on the program and, even when the trajectory of the robot passes along the proximity of a side of an obstacle, spatial grasping at end points 1020 and 1021 of the obstacle 1001, at which interference with the obstacle 1001 is liable to take place, is easy.

The statement L4 represents the procedure of releasing the grasped workpiece at the work assembling position P3 at 1010 and assembling the same.

The statement L5 represents a procedure for grasping the thus assembled workpiece by means of another chuck 2 (not shown) provided at the operating end of the robot.

The statement L6 represents the procedure for maneuvering the workpiece to the final position P6 at 1017 bypassing the obstacle 1002. This procedure differs from that in statement L3 in that NFOS(n) and HFOS(n) are used in a reverse relationship. Specifically, an overlapping operation based on an overlapping operation ending point control is performed first, and then another overlapping operation based on overlapping operation beginning point control is performed. Thus, it can be readily understood that, by such overlapping operations, even when the trajectory of the robot passes along the proximity of an upper portion of the obstacle 1002, spatial grasping at end points 1022 and 1023 of the obstacle 1002, at which point interference with the obstacle 1002 is liable to take place, is easy because an overlapping operation ending point 1013 and an overlap operating stating point 1014 can be designated explicitly on the program. Further, the location of an intermediate point 1011 at which the overlapping operation is started and an intermediate point 1016 at which the operation is ended are determined uniquely by calculations in the numerical control apparatus.

The statement L7 represents the step of releasing the workpiece at the final position P6 at 1017.

The series of robot operations is completed by the steps described above. It should be noted that, when the trajectory of the robot passes along the proximity of the upper portion of an obstacle and along the proximity of the opposite side portions of an obstacle, that is, when the trajectory of the robot passes in the neighborhood of the entire periphery of an obstacle, ordinary operation commands should be described without designating HFOS(n) or NFOS(n).

Figure 11:
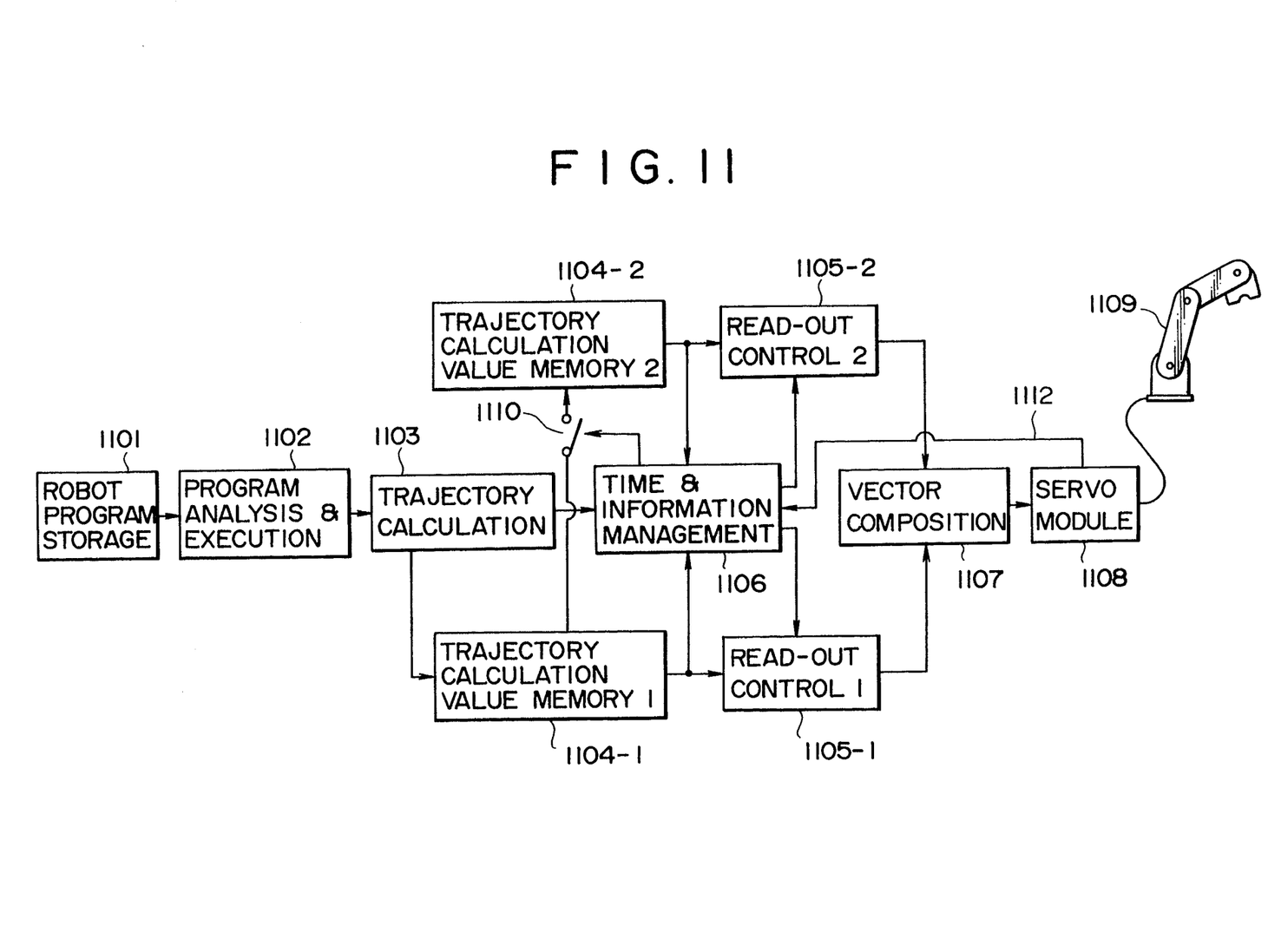
FIG. 11 is a block diagram of a numerical control apparatus for a robot showing a preferred embodiment of the present invention.

2. Construction of a Numerical Control Apparatus of an Embodiment of the Present Invention A numerical control apparatus for use in the present invention is shown in FIG. 11. The numerical control apparatus of the present invention (1) calculates an aimed position of movement of a robot for each unit time, and (2) delivers the thus calculated aimed position to a servo unit in order to move the robot to a position designated by a robot program.

Referring to FIG. 11, the numerical control apparatus of the present invention includes a robot program storage section 1101 for storing therein a robot program as described hereinabove. The robot program is stored after the text thereof is coded into ASCII codes or is converted into a predetermined code for each command.

A program analysis and execution section 1102 reads out the program from the robot program storage section 1101 and analyzes and executes the robot program including a process of a FOR~NEXT loop, a simple calculation or the like. An interpretation procedure should be such as is executed, for example, by a BASIC interpreter installed in a personal computer on the market. In order to operate the robot, it is only necessary to calculate an "aimed position of an operation" in terms of rectangular coordinates and then transmit the information to a trajectory calculation section 1103.

The trajectory calculation section 1103 calculates how to operate the robot based on the aimed position information delivered thereto from the program analysis and execution section 1102. More particularly, the trajectory calculation section 1103 calculates the position information of coordinate values for each unit time to determine a position information string. It should be noted that the hardware may additionally include an interleave memory for storing information calculated at an earlier stage which will be stored in a trajectory calculation value memory 1104, which will be described below. The unit time may be determined based on a response characteristic of the robot operation (that is, a frequency response characteristic of the robot as viewed from a servo section) and should be set to 10 ms or less for practical use.

A pair of trajectory calculation value memories 1104-1 and 1104-2 store trajectory information for each unit operation therein. The trajectory calculation value memories 1104-1 and 1104-2 are connected so that the position information string calculated by the trajectory calculation section 1103 is first stored into the trajectory calculation value memory 1 at 1104-1. When an overlapping operation is performed, trajectory information for each overlap unit operation is also stored in the trajectory calculation value memory 2 at 1104-2 in accordance with a processing procedure which will be hereinafter described. In this instance, trajectory information for the trajectory calculation value memory 2 at 1104-2 is stored by transferring it from the trajectory calculation value memory 1 at 1104-1 by way of a transfer switch 1110. The transfer switch 1110 shows conceptually a switch for transferring the contents of the trajectory calculation memory 1 at 1104-1, without change, to the trajectory calculation value memory 2 at 1104-2. Such transfer is performed in accordance with an instruction from a time and information management section 1106.

A pair of read-out control sections 1105-1 and 1105-2 successively read out trajectory information for each unit time in accordance with a read-out starting instruction from the time and information management section 1106.

A vector composition section 1107 converts output values from the read-out control sections 1105-1 and 1105-2 into a single position instruction value and delivers the position instruction value to a servo unit or module 1108.

The servo unit 1108 controls a robot body 1109 in accordance with an output value from the vector composition section 1107. Any known servo unit may be employed as such servo unit.

The time and information management section 1106 normally monitors the trajectory calculation value and develops an instruction to render both the read-out control section 1 at 1105-1 and section 2 at 1105-2 operative when an instruction value representing the position at which an overlapping operation should be started is received.

It should be noted that the time and information management section 1106 may monitor at a position shown at 1112, not a trajectory calculation value but a value representing the current position of the robot kept by the servo unit 1108. Monitoring and utilization of current position information of the robot kept by the servo unit allows more accurate control of the robot since an overlapping operation starting control involving a mechanical delay of the robot can be achieved. Selecting between these methods may be based on cost or some other factor upon designing of the numerical control apparatus.

The components described above can be realized not only by hardware but also by software. Software can readily realize the components if the program analysis and execution section 1102 and the trajectory calculation section 1103 are described in a main program while the read-out control sections 1105-1 and 1105-2, the time and information management section 1106 and the vector composition section 1107 are each described in a real time interrupt routine which is activated for each unit time by a real time interruption. A program language which operates on the real time basis such as, for example, the language C may be employed. A memory of a CPU (central processing unit) which executes the software may be utilized for the robot program storage section 1101 and the trajectory calculation value memories 1104-1 and 1104-2. Further, the memory transferring portion provided by the transfer switch can be realized only by rewriting of a write/read pointer, and only ten to thirteen microseconds or so at the most are necessary for such transfer.

3. Processing Procedure of the Numerical Control Apparatus

An operation algorithm for the numerical control apparatus having such construction as described above will be described in this section.

3-1. Operation Involving No Overlapping Operation

When no overlapping operation is to be performed, that is, when the robot program does not include any HFOS(n) and NFOS(n) commands, the trajectory calculation value memory 2 at 1104-2, the read-out control section 2 at 1105-2 and the transfer switch 1110 are inoperative.

The robot program stored in the robot program storage section 1101 is read out and analyzed by the program analysis and execution section 1102. The robot program, including a process of a FOR NEXT loop, a simple calculation and so forth except trajectory calculations regarding operation of the robot, is executed by the program analysis and execution section 1102. In regards to the commands for the actual operations of the robot, aimed position information is delivered to the trajectory calculation section 1103, at which position coordinate values for each unit time are calculated to obtain a position information string in order to determine how to operate the robot. The position information for coordinate values for each unit time is calculated in accordance with a fixed acceleration/deceleration pattern. The produced acceleration/deceleration pattern used in the present embodiment is preferably a pattern such as the one disclosed in Japanese Patent Laid-Open Application No. Heisei 4-31907 "Acceleration/Deceleration Pattern Producing Apparatus" because a variation of the acceleration/deceleration pattern when the velocity upper limit is varied can be fully managed.

The calculated position information string is stored in the trajectory calculation value memory 1 at 11041-1. After calculation of the position information string for a single operation is completed, the read-out control section 1 at 1105-1 successively reads out the trajectory information for each unit time in accordance with a reading out instruction for each unit time read out from the time and information management section 1106. Since the read-out control section 2 at 1105-2 is inoperative, the output of the vector composition section 1107 is the output of the read-out control section 1 1105-1, and this is delivered to the servo unit 1108, by which the robot body 1109 is controlled.

Figure 12:
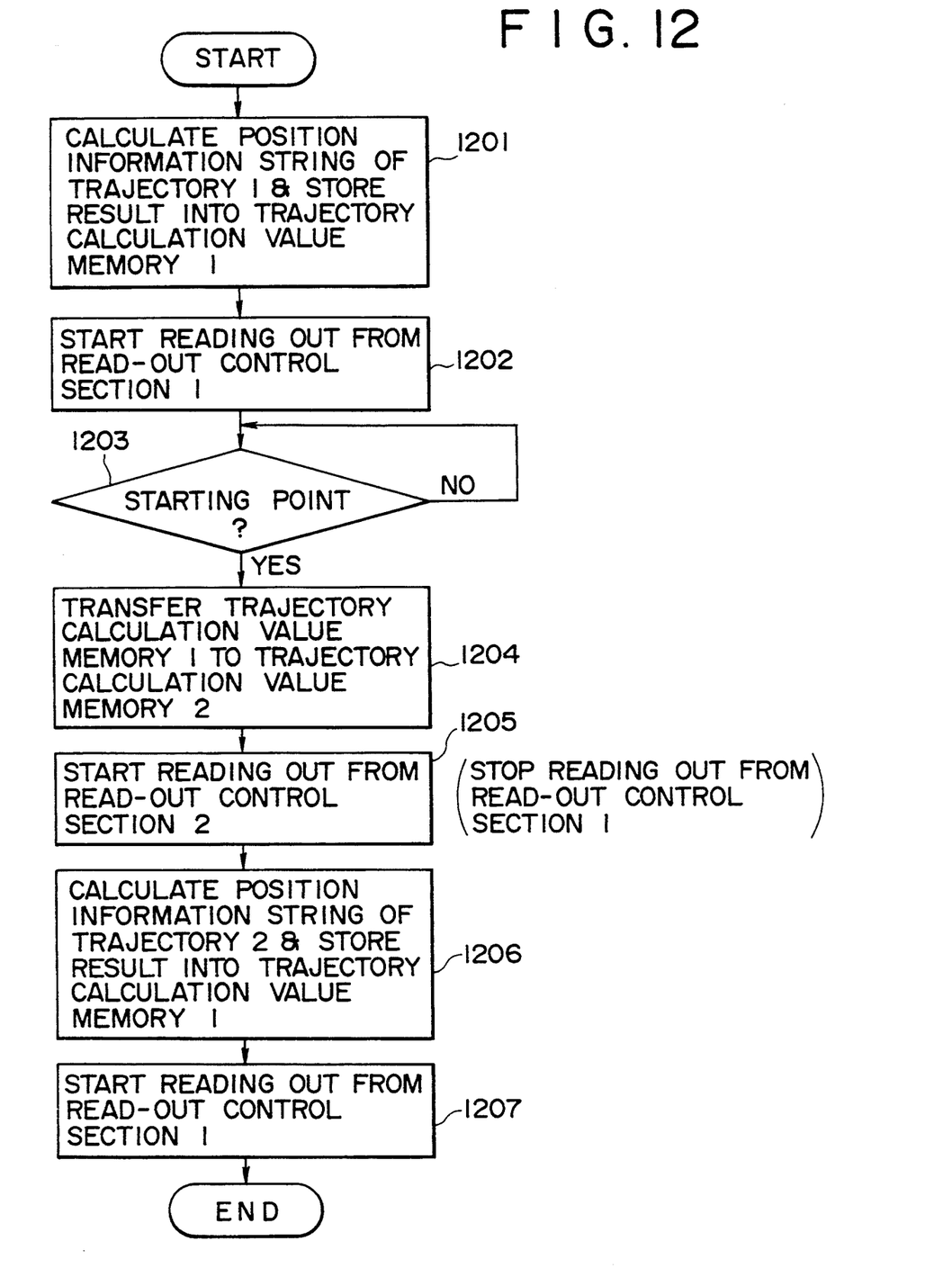
FIG. 12 is a flow chart illustrating the overlapping operation starting point control of the present invention.

3-2. Processing Procedure of Overlapping Operation Starting Point Control (FIG. 12)

Whether or not an overlapping operation is to be performed is determined by the program analysis and execution section 1102. This information is delivered to the time and information management section 1106 by way of the trajectory calculation section 1103. When an overlapping operation starting point control is to be performed, the numerical control apparatus executes a process in accordance with a processing procedure such as the one illustrated in FIG. 12.

For convenience of description the process will be described by assuming that the program executes the statement move HFOS(20),p1,p2. Further, for convenience of description, the trajectory of an operation to the point P1 is referred to as trajectory 1 and the trajectory of an operation from the point P1 to the point P2 is referred to as trajectory 2.

First, the trajectory calculation section 1103 receives the coordinate values of the point P1 together with the instruction of HFOS(20), calculates from the information received the position information string for the trajectory 1 for each unit time and stores the calculated result in the trajectory calculation value memory 1 at 1104-1 (step 1201). Upon storage of the position information string for the trajectory 1, the trajectory calculation section 1103 delivers an instruction by way of the time and information management section 1106 to the read-out control section 1 at 1105-1 to start reading out (step 1202). Consequently, the robot starts its operation regarding the trajectory 1.

Subsequently, the time and information management section 1106 monitors the contents of the trajectory calculation value memory 1 at 1104-1 to check whether or not the position at which an overlapping operation should be started has been reached (step 1203). When the instruction value reaches the overlapping operation starting point, that is, when the instruction value reaches the position indicates a passage of 20% of the trajectory 1, the time and information management section 1106 transfers the contents of the trajectory calculation value memory 1, as they are, to the trajectory calculation value memory 2 by way of the transfer switch 1110 (step 1204).

It should be noted that monitoring of the instruction value may be performed not only by direct monitoring of the instruction value itself but also by monitoring of the current position information of the robot kept by the servo unit 1108 as described hereinabove. Further, rather than monitoring the instruction value or the current value directly, the value of a read address may, alternatively, be monitored. This can be done since the overlapping operation starting position is known in advance by the trajectory calculation section 1103. Further, the address read can be calculated from the overlapping operation starting position.

Further, upon transfer, a read pointer (not shown) kept by the read-out control section 1 at 1105-1 is also copied into the read-out control section 2 at 1105-2, and the read-out control section 2 at 1105-2 is activated immediately (step 1205). Thereupon, the read-out control section 1 at 1105-1 simultaneously stopped. Consequently, the position information string for the trajectory 1 and the read out portion of it are obtained by way of the read-out control section 2 at 1105-2.

Subsequently, the trajectory calculation section 1103 calculates a position information string for the trajectory 2, stores the calculated result in the trajectory calculation value memory 1 at 1104-1 (step 1206) and immediately transmits a read-out starting instruction to the read-out control section 1 at 1105-1 so that the overlapping operation may be begun (step 1207).

3-3. The Processing Procedure of The Overlapping Operation

Figure 13:
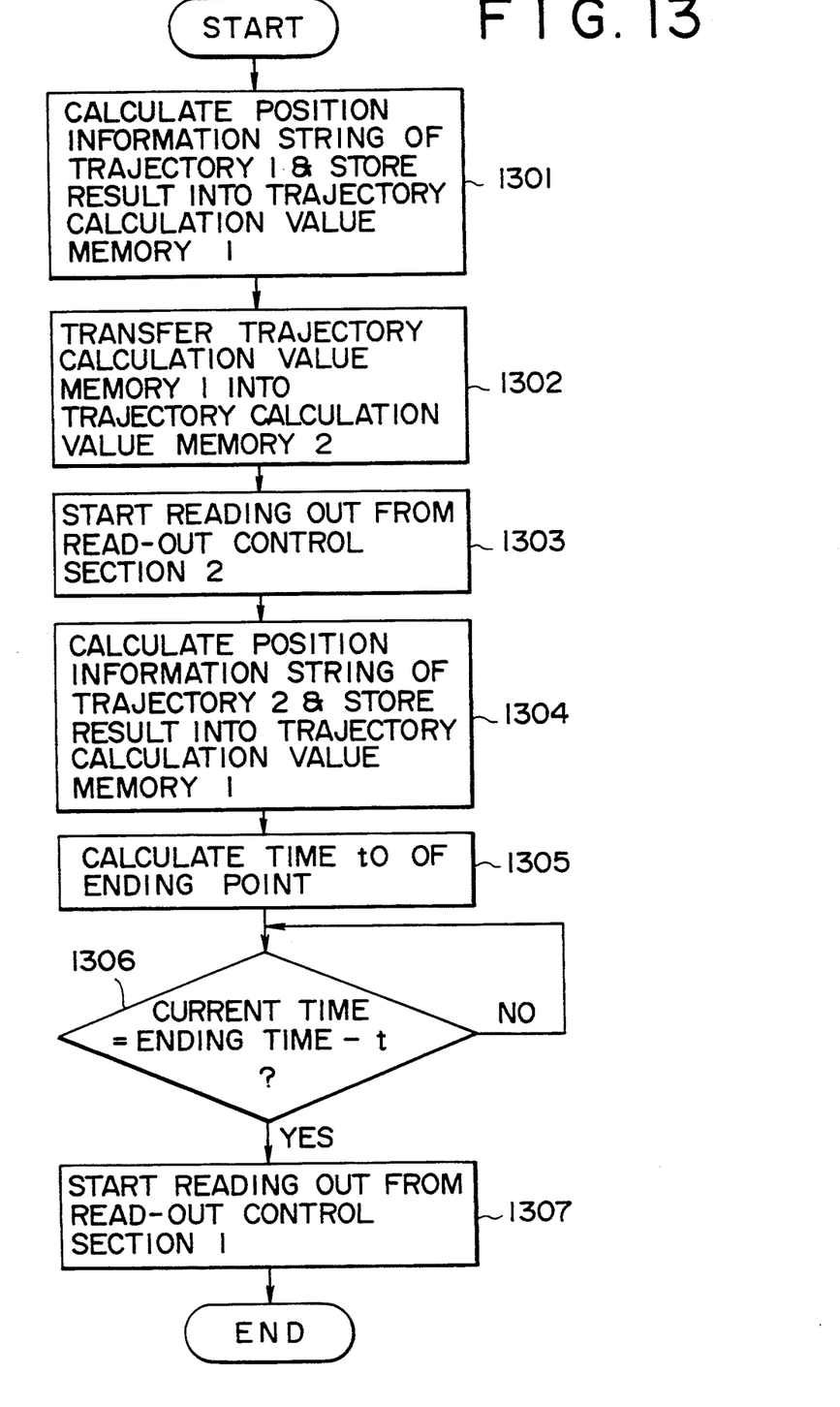
FIG. 13 is a flow chart illustrating the overlapping operation ending point control of the present invention.

Ending Point Control (FIG. 13)

When the overlapping operation ending point control is to be performed, the numerical control apparatus executes a process in accordance with a processing procedure as illustrated in FIG. 13.

For convenience of description the procedure will also be described assuming that the program executes the statement move NFOS(20),p1,p2. Further, the trajectory of the operation to the point P1 will also be referred to as trajectory 1 and the trajectory of an operation from the point P1 to the point P2 will also be referred to as trajectory 2.

The trajectory calculation section 1103 receives the coordinate values of the point P1 together with the instruction of NFOS(20), calculates from the information received the position information string for the trajectory 1 for each unit time and stores the calculated result in the trajectory calculation value memory 1 at 1104-1 (step 1301). In the present control mode, immediately after the position information string is written into the trajectory calculation value memory 1, the trajectory calculation section 1103 transfers the contents of the same to the trajectory calculation value memory 2 at 1104-2 to allow a calculation of the trajectory 2 to be started immediately.

Reading out of the position information string of the trajectory 1 transferred for each unit time is then started by the read-out control section 2 at 1105-2 (step 1303). Thereafter, the trajectory calculation section 1103 immediately starts a calculation of the trajectory 2 and stores the calculation in the trajectory calculation value memory 1 at 1104-1 (step 1304). Since the entire position information of the trajectory 2 is stored in the trajectory calculation value 1 at 1104-1, the ending point designation position, here, the position at 20%, is searched out from within the entire position information to obtain the point of time for the position (step 1305).

Figure 14:
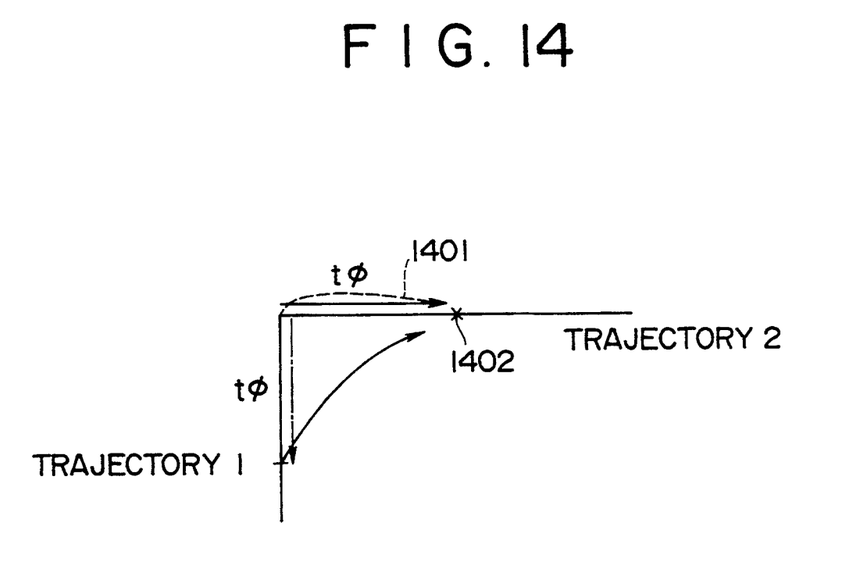
FIG. 14 is a diagrammatic view illustrating an ending point in the overlapping operation ending point control of the present invention.

The point of time corresponds to the time required to move from the starting point of the trajectory 2 to the overlapping operation ending point and is a time to 1401 shown in FIG. 14. Accordingly, if an overlapping operation is started at the time to prior to completion of the operation of the trajectory 1, then the robot can end the operation regarding the trajectory 1 when it comes to the overlapping operation ending point 1402 in the trajectory 2.

From this, the time and information management section 1106 confirms the point of time, and when the point of time comes (step 1306), the time and information management section 1106 delivers a reading out instruction to the read-out control section 1 at 1105-1 to start an operation regarding the trajectory 2 (step 1307).

It should be noted that, the monitoring of the 10 point of time may in this instance also be performed by monitoring the value of the read address, by monitoring an instruction value corresponding to the point of time, by monitoring the current position information of the robot kept by the servo unit or by monitoring of some other factor as described hereinabove.

The desired overlapping operation ending point control can be performed by the processing described above.

Having now fully described the invention, it will be apparent to one of ordinary skill in the art that many changes and modifications can be made thereto without departing from the spirit and scope of the invention as set forth herein.

What is claimed is:

1. A numerical control apparatus for a robot, comprising:
   a robot program storage means for storing a program comprised of a procedure of operations for said robot including at least first and second movement operations having aiming position information corresponding to predetermined positions towards which the robot is intended to be moved within respective operation time periods;
   a program analysis and execution means for reading said program from said robot program storage means, analyzing contents of said program and executing said program, wherein, said program analysis and execution means outputs said aiming position information for each of said movement operations of said robot having said aiming position information;
   a trajectory calculation means for determining and outputting a position information string for each of said movement operations having aiming position information output from said program analysis and execution means,
   each position information string comprising a series of positions needed to move said robot within an operation time period of said movement operation along a trajectory to the predetermined position provided in said aiming position information of said movement operation, each position of said series of positions being calculated by said trajectory calculating means for each unit time within said operation time period as needed to move said robot along a trajectory to said predetermined position corresponding to said aiming position information of said movement operation;
   a first memory for storing a position information string obtained from said trajectory calculation means;
   a second memory to which said position information string stored in said first memory is transferred in response to a transfer switch means;
   a first read-out control means for reading out said position information string in said first memory, said positions in said position information string being read at unit time intervals;
   a second read-out control means for reading out said position information string in said second memory, said positions in said position information string being read at said unit time intervals;
   a time and information management means for providing a read-out starting instruction to each of said first and second read-out control means and for providing a transfer instruction to said transfer switch means for initiating transfer of the contents of said first memory to said second memory;
   said time and information management means performs an overlapping operation, wherein, both of said first and second read-out control means are activated to read-out position information strings stored in said respective first and second memory, whereby, said first and second movement operations are effected;
   said overlapping operation being initiated in response to at least one of an overlapping operation starting point instruction or an overlapping operation ending point instruction when either instruction is read in said program by said program analysis and execution means;
   wherein, said overlapping operation starting point instruction includes information on a predetermined proportion of said first movement operation, and in response to said overlapping operation starting point instruction said time and information management means sends said transfer instruction to said transfer switch and begins said overlapping operation when said predetermined proportion of said first movement operation has been completed;

said overlapping operation ending point instruction includes information on a predetermined proportion of said second movement operation succeeding said first movement operation, and in response to said overlapping operation ending point instruction, said time and information management means sends said transfer instruction to said transfer switch means and begins said overlapping operation during said first movement operation such that said first movement operation will expire when said predetermined proportion of said second movement operation has been completed during said overlapping operation.

2. The numeric control apparatus according to claim 1, further comprising:

a vector composition means connected to said first and second read-out control means for composing position information read out from said first and second read-out control means by vector composition and outputting an output signal representative thereof; and a servo module for controlling said robot in response to said output signal from said vector composition means.

3. The numeric control apparatus according to claim 1, further comprising a central processing unit comprised of a main memory, a main program, and a real-time interrupt routine, wherein, said main memory includes said robot program storage means, said first memory, and said second memory;

said main program includes said program analysis and execution means and said trajectory calculation means; and said real-time interrupt routine includes said time and information management means, said first read-out control means, and said second read-out control means.

4. A numeric control apparatus for a robot, comprising:

means for storing a program describing a series of operations for effecting movement of said robot;

means for reading said program;

means for overlapping a first operation for moving said robot to a first position and a second operation for moving said robot to a second position in accordance with a starting point command read from said program to provide a curvilinear trajectory of robot movement; wherein said starting point command designates the proportion of said first operation to be completed before said second operation is started and overlapped with said first operation; and means for performing said first and second operations in response to said means for overlapping to thereby effectuate movement of said robot.

5. The numeric controller apparatus according to claim 4, wherein said means for overlapping overlaps said first and second operations in accordance with an ending point command; wherein, said ending point command designates the proportion of said second operation to be completed at the end of said overlapping of operations and the means for overlapping begins said overlapping operation such that said overlapping operation is completed when said designated proportion of said second operation is completed.

6. The numeric controller apparatus according to claim 5, wherein said means for overlapping comprises:

a first means for storing a position string for said first and second operations;

a second means for receiving and storing a first position string for said first operation from said first storing means;

first and second means for reading said first and second means for storing, respectively; and means for instructing said first storing means to transfer said first position string to said second storing means, for instructing said second reading means to read said transferred position string and begin said first operation, and for instructing said first reading means to read a second position string for said second operation so that said overlapping of first and second operations is completed when said designated proportion of said second operation is completed.

7. The numeric controller apparatus according to claim 4, wherein said means for reading a program comprises a program and analysis and execution section for reading said program, analyzing the contents of said program and executing said program and a trajectory calculator for calculating a position string indicating the positions to which said robot should be moved for each unit time interval during a movement operation time period.

8. The numeric controller apparatus according to claim 4, wherein said means for overlapping comprises:

a first means for storing a position string for said first and second operations;

a second means for receiving and storing a first position string for said first operation from said first storing means;

first and second means for reading said first and second means for storing, respectively; and means for instructing said first reading means to read said first position string and begin said first operation, for instructing said first reading means to transfer said first position string to said second storing means upon completion of said designated proportion of said first operation, for instructing said second reading means to read said transferred first position string and for instructing said first reading means to read a second position string for said second operation to start said overlapping of said first and second operations.

9. A process for controlling a robot, having a program therein describing a series of operations for moving the robot to a series of positions, by overlapping selected successive series of operations, the process comprising:

performing a first operation of moving said robot towards a first position;

determining the proportion of the first operation to be completed before a subsequent operation is started to move the robot to a subsequent position in order to create a curvilinear trajectory; and performing said subsequent operation after said determined proportion of said first operation is completed to overlap said first and subsequent operations.

10. A process for controlling a robot, having a program therein describing a series of operations for moving the robot to a series of positions, by overlapping selected successive series of operations, the process comprising:

performing a first operation of moving the robot to a first position;

determining the proportion of a subsequent operation of moving the robot to a subsequent position which should be completed by the completion of an overlapping of said first operation and subsequent operation to create a curvilinear trajectory; and performing said first and subsequent operations to overlap said operations so that said determined proportion of said subsequent operation is completed when said overlapping of operations is completed.

11. A numeric control apparatus for a robot, comprising:

means for storing a program describing a series of operations for effecting movement of said robot;

means for reading said program;

means for overlapping a first operation for moving said robot to a first position and a second operation for moving said robot to a second position in accordance with a command read from said program to provide a curvilinear trajectory of robot movement; wherein said command designates the proportion of said second operation to be completed when said first operation is completed and is no longer overlapped with said second operation; and means for performing said first and second operations in response to said means for overlapping to thereby effectuate movement of said robot.

12. The numeric controller apparatus according to claim 11, wherein said means for overlapping comprises:

a first means for storing a position string for said first and second operations;

a second means for receiving and storing a first position string for said first operation from said first storing means;

first and second means for reading said first and second means for storing, respectively; and means for instructing said first storing means to transfer said first position string to said second storing means, for instructing said second reading means to read said transferred position string and begin said first operation, and for instructing said first reading means to read a second position string for said second operation so that said overlapping of first and second operations is completed when said designated proportion of said second operation is completed.

13. A process of controlling a robot with a control means having a program storage means for storing a program comprised of codes representative of a procedure of operations of said robot therein, including at least two movement operations for said robot, said process comprising the steps of:

(a) reading each code in said program sequentially;

(b) identifying when said code being read includes a movement command for a single robot movement operation;

(c) determining when at least two movement commands each representing a single robot operation of movement from a designated point to another designated point occur successively;

(d) selecting, when two successive movement commands have been determined in said determining step (c), one operation from among (i) a starting point designating type overlapping operation wherein an overlapping operation, comprising the step of performing said first and second movement operations corresponding to said selected two successive movement commands, is started when a designated proportion of the first movement operation has been completed, (ii) an ending point designating type overlapping operation wherein an overlapping operation, comprising the step of performing said first and second movement operations corresponding to said selected two successive movement commands, is ended when a designated proportion of the second movement operation has been completed, and (iii) an independent operation wherein the second movement operation is performed after completion of the preceding first movement operation; and (e) controlling said robot with said control means in accordance with said operation selected in step (d).

* * * * *